May 20, 1958 R. A. SANDBERG 2,835,139
FOOT OPERATED PARKING BRAKE ASSEMBLY
Filed Nov. 25, 1955 3 Sheets-Sheet 2
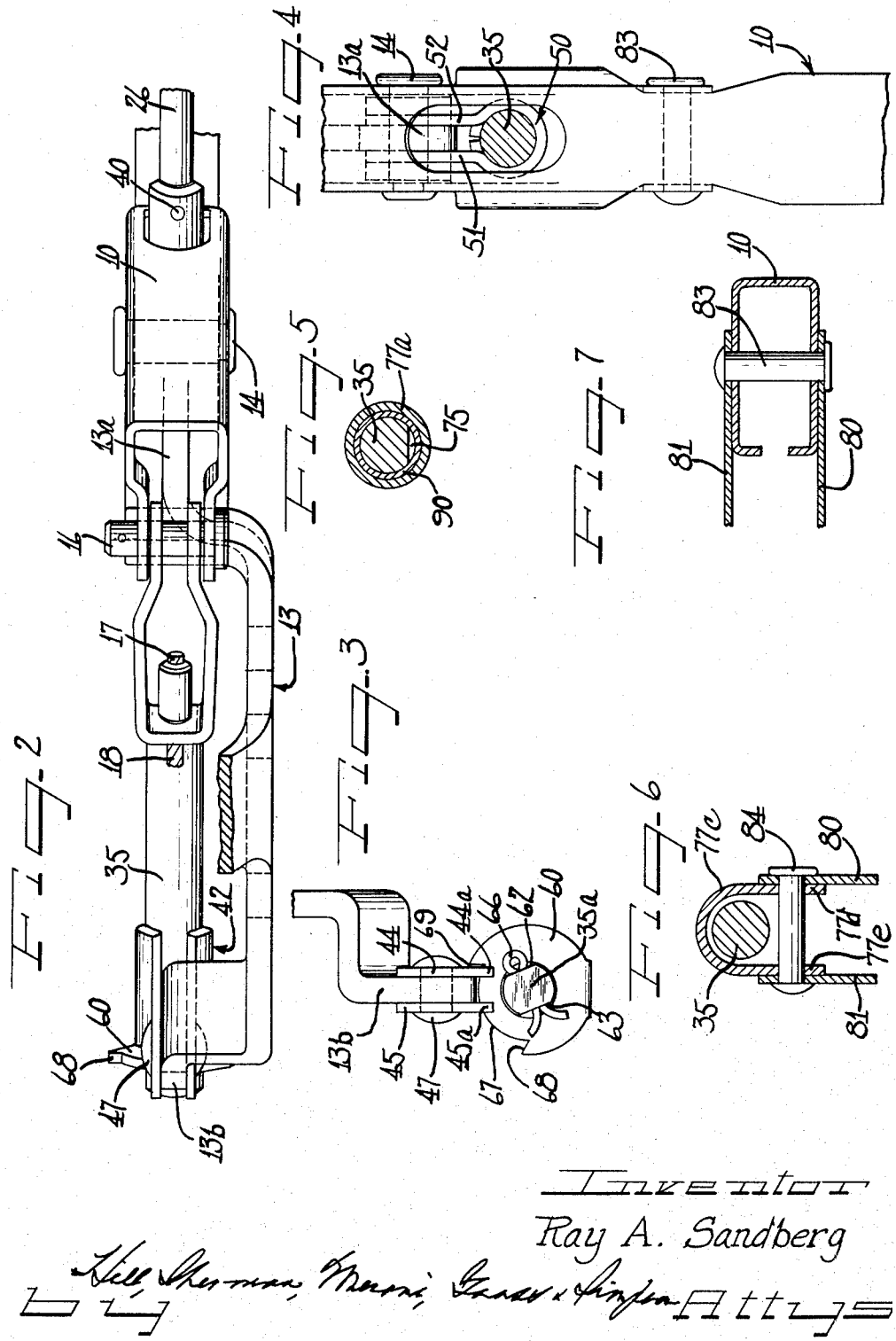
Inventor
Ray A. Sandberg May 20, 1958 R. A. SANDBERG 2,835,139
FOOT OPERATED PARKING BRAKE ASSEMBLY
Filed Nov. 25, 1955 3 Sheets-Sheet 3

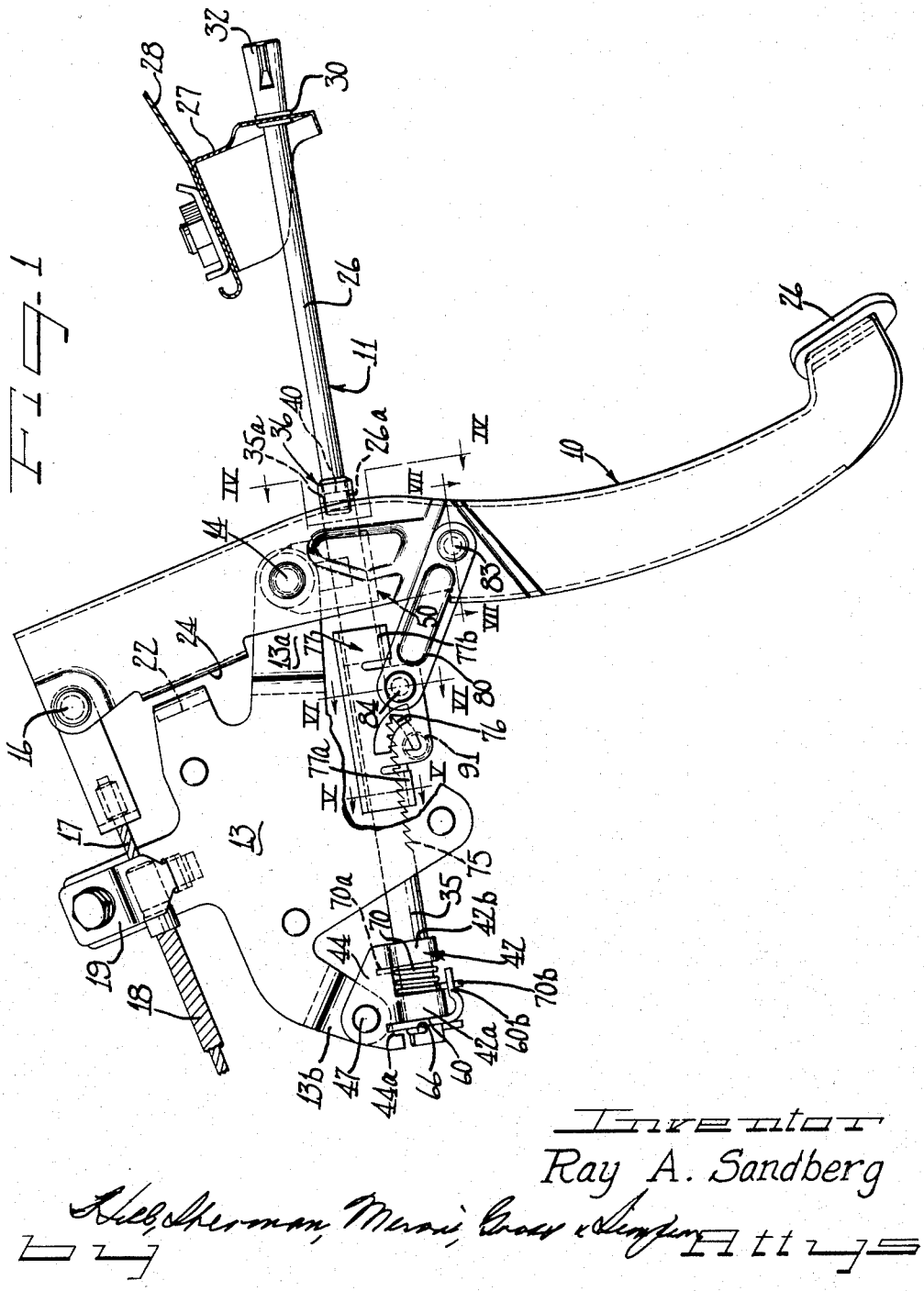

Inventor
Ray A. Sandberg

United States Patent Office 2,835,139
Patented May 20, 1958

2,835,139

FOOT OPERATED PARKING BRAKE ASSEMBLY

Ray A. Sandberg, Waukegan, Ill., assignor, by mesne assignments, to The Bingham-Herbrand Corporation, a corporation of Ohio Application November 25, 1955, Serial No. 549,053

6 Claims. (Cl. 74—539)

This invention relates to a lever structure and particularly to a foot operated brake assembly operable selectively as an emergency brake or a parking brake.

It is an object of the present invention to provide a novel lever assembly for assembly in a motor vehicle or the like.

It is another object of the present invention to provide a foot operated brake lever assembly which is particularly rugged and reliable, and which is readily manufactured.

It is another important object of the present invention to provide a novel and improved brake lever assembly which is selectively operable as a parking brake or a running brake.

In accordance with the features and objects of the present invention, there is provided a brake lever assembly comprising an elongated rod having ratchet teeth therealong, a sleeve member slidable along said rod and carrying a pawl for cooperation with said ratchet teeth in one angular position of the rod, a brake lever arm pivotally mounted for actuation to apply a brake setting force and having a linkage pivotally connected to the sleeve member for moving the sleeve member along the rod as the brake lever arm is moved in brake applying direction and in one angular orientation of the rod retaining the brake lever arm in an attained brake setting position by interengagement between said pawl and said ratchet teeth.

In accordance with a further feature of the present invention, the rod is provided with detent means for establishing a ratcheting and a non-ratcheting angular orientation of the rod whereby the brake lever assembly may be utilized selectively as a parking brake or as a running brake, for example in emergencies.

Other and further important objects, features and advantages of the present invention will become more fully apparent from the following detailed description taken in conjunction with the accompanying drawings.

On the drawings:

Figure 1 is a side elevational view of a foot operated brake lever assembly in accordance with the present invention and showing a portion of the instrument panel of the vehicle broken away and in section;

Figure 2 is a fragmentary plan view of the brake lever structure of Figure 1 with a portion thereof broken away and in section;

Figure 3 is a fragmentary end elevational view of the structure of Figure 1;

Figure 4 is a fragmentary vertical sectional view taken generally along the line IV—IV of Figure 1;

Figure 5 is a cross sectional view taken generally along the line V—V of Figure 1;

Figure 6 is a fragmentary cross sectional view taken along the line VI—VI of Figure 1;

Figure 7 is a fragmentary horizontal sectional view taken generally along the line VII—VII of Figure 1;

As shown on the drawings:

Figure 8:
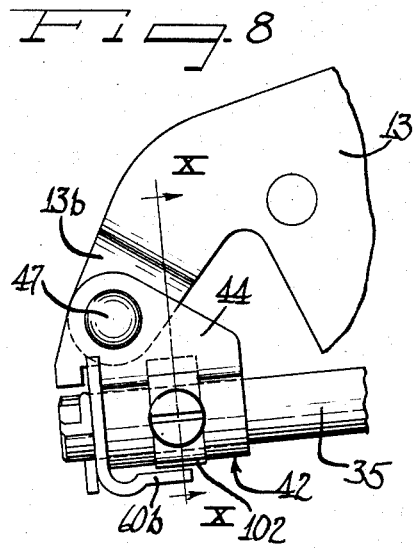
Figure 8 is a fragmentary enlarged side elevational view of a modified brake lever assembly with parts not shown identical to Figure 1.

The brake lever structure shown in Figure 1 includes a pivotally mounted brake lever arm 10 for applying an actuating force to the brakes of the vehicle and a retaining and release mechanism 11 for selectively retaining the arm in a braking position if the assembly is to be used as a parking brake. The brake lever arm 10 is mounted, for example, by means of a bracket 13 secured to the left side panel of the vehicle. A rivet 14 secures side wall portions of lever 10 for pivotal movement relative to a flange 13a of bracket 13. The lever arm is connected by means of a pin 16 at the upper end thereof to a brake actuating cable 17 which is disposed within a flexible housing 18 secured by means of a clamp 19 to the bracket 13. The bracket 13 has a turned flange 22 opposing a flange 24 on the brake lever arm 10 to limit movement of the brake lever in the brake release direction. At its lower end, the lever arm 10 carries a foot pedal 26 for actuation by the foot of the operator.

The retaining mechanism 11 comprises an elongated rod 26 mounted at its rear end by means of a bracket 27 secured to the instrument panel 28 of the vehicle. A rubber grommet 30 provides a bearing for rotation of the rod 26 by means of a handle 32 secured to the rear end of the rod. The rod 26 is coupled to a ratchet rod 35 by means of a universal coupling 36. Specifically an end portion 26a of the rod 26 extends into a socket 35a of the rod 35 in a relatively loose fit to leave a clearance space about the perimeter of the rod 26 within the socket, and a pin 40 retains the end 26a in the socket and couples the rods 26 and 35 for joint rotation upon turning of the handle 32.

The rod is journaled at its forward end by means of a collar member 42 comprising a slotted strip of sheet metal curled about the rod 35 to provide a pair of ring portions 42a and 42b and upstanding wall portions 44 and 45, Figure 3. At its rear end, the rod 35 is journaled by a similar bearing member 50 of sheet material extending around the periphery of the rod 35 in sliding relation thereto with a pair of upstanding wall portions 51 and 52, Figure 4, secured by means of the rivet 14 to the flange 13a of the bracket 13. Similarly, a rivet 47 secures the wall portions 44 and 45 to a depending flange portion 13b of the bracket 13.

For limiting the range of rotation of the rod 35, a stop plate 60 is fixed to end portion 35a of rod 35 for rotation therewith. As seen in Figure 3, end portion 35a of rod 35 has parallel flattened side faces 62 and 63 extending a short distance back from the forward extremity thereof whereby to afford a rotational coupling within a complementary eye of the stop plate 60. The plate 60 may be held on the end 35a by suitable fastening means such as cotter pin 66 extending through the end portion 35a. The stop plate 60 has a notch 67 in the periphery thereof providing spaced stop shoulders 68 and 69 cooperating with depending lug portions 44a and 45a of upstanding wall portions 44 and 45.

For biasing the rod 35 toward one of its extreme angular orientations, a torsion spring is disposed in the slot in the collar member 42 and has one end 70a disposed between the upstanding wall portions 44 and 45 to anchor the same and has the opposite end portions 70b engaging an extension portion 60b of stop plate 60. Thus, normally, the torsion spring 70 acts on the extension 60b to tend to rotate the rod 35 in the clockwise direction when viewed from the rear looking forwardly. Twisting of the handle 32 in the counter-clockwise direction brings the stop 68 against the lug 45a, Figure 3.

For retaining the lever arm 10 in incremental brake setting positions to which moved the rod 35 is provided with a series of ratchet teeth 75 cooperating with a pivotal pawl member 76 carried by a sleeve member 77 slidable along the rod 35. Link arms 80 and 81 couple the lever arm 10 to the sleeve member 77 and are connected to the lever arm 10 by means of a rivet 83 and to the sleeve member by means of a rivet 84. The sleeve member 77 has ring portions 77a and 77b at the front and rear ends thereof encircling the rod 35 for retaining the sleeve member thereon. As seen in Figure 5, these ring portions such as 77a have bearing bushings 90 force fit therein for sliding on the rod 35 to maintain the intermediate portion 77c of the sleeve member in spaced relation to the rod as seen in Figure 6. Spring means 91 is provided on the pawl 76 for urging the same into engagement with the ratchet teeth 75 in succession as the sleeve 77 is moved along the rod 35 by movement of the lever arm 10 towards brake setting condition. As seen in Figure 6, the rivet 84 securing the links 80 and 81 to the sleeve member extends through depending wall portions 77d and 77e depending from the intermediate portion 77c of the sleeve member.

*Operation of the embodiment of Figure 1*

In order to apply the brakes in the embodiment of Figure 1, a foot of the operator, for example the left foot, moves the brake lever about the pivot 14 toward brake setting position. This pivotal movement causes longitudinal movement of the sleeve member 77 along the rod 35 due to the links 80 and 81 coupling the lever to the sleeve member. As the sleeve member 77 is advanced, the pawl 76 engages successive teeth 75 on the rod 35 to retain the lever 10 in its attained position.

When it is desired to release the brakes, the handle 32 is grasped, for example by the left hand of the operator, and twisted counter-clockwise to move the ratchet teeth 75 out of engagement with the pawl 76, and thus to allow the tension of the brakes on the actuating cable 17 to return the brake lever 10 to its initial position shown in Figure 1.

Figure 9:
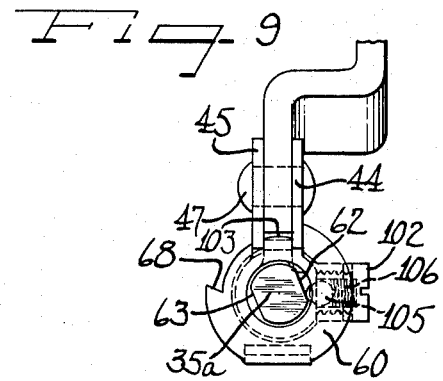
Figure 9 is a fragmentary end elevational view of the modified structure shown in Figure 8.
Figure 10:
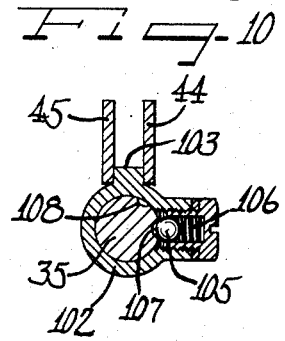
Figure 10 is a vertical cross sectional view taken generally along the line X—X of Figure 8.

In the embodiment of Figures 8 to 10, the structure is identical to Figure 1 except for the parts illustrated, and the structure will be described, by referring to the reference numerals of Figure 1 as though the relevant structure of Figure 1 had been repeated in Figure 8. The collar member 42 functions as previously described to limit the range of rotation of the rod 35 relative to the bracket portion 13b. However, in this embodiment, in place of the torsion spring, a detent housing 102 is telescoped onto a circular cross section end portion of the rod 35 with a lug 103 of the detent housing projecting between the wall portions 44 and 45 to prevent rotation of the detent housing 102 with the rod 35. The housing carries a detent ball 105 urged by means of a compression spring 106 against the rod 35 which has angularly spaced recesses 107 and 108 for receiving the ball 105 in the respective extreme angular positions of the rod 35 corresponding to a ratcheting position of the rod wherein the ratchet teeth on the rod 35 are engageable with the pawl 76, and a non-ratcheting position, where the pawl 76 rides on a smooth surfaced peripheral portion of the rod 35 and is not engageable with the ratchet teeth 75.

It will be apparent that the handle 32 will be retained in either of its extreme angular positions by the detent pawl 105 engaging in one of the recesses 107 or 108. When the rod 35 is in the angular position shown in Figure 10 with the ball 105 in the detent recess 107, the rod is in ratcheting orientation and the pawl 76 will engage the ratchet teeth 75 as the brake lever 10 is moved toward brake setting condition to retain the brake lever in successive positions to which it is moved, the assembly thus acting as a parking brake. However, with the handle 32 turned counter-clockwise approximately 60 degrees, the detent ball 105 will engage the recess 108 to hold the rod 35 in non-ratcheting position where the pawl 76 will not engage the ratchet teeth 75. In this case, the actuation of the brake lever arm 10 applies the brakes and release of the lever arm 10 by removing the foot from the foot pedal 26 allows the brakes to be released automatically due to the tension thereof so that the assembly is adapted to operate as a running brake or emergency brake. It will be understood, therefore, that the vehicle would normally be operated with the handle 32 turned counter-clockwise and the ball 105 in the recess 108, so that the brakes could be momentarily applied and automatically released without any hand manipulation while the vehicle is in motion. If it is desired to use the assembly as a parking brake, the handle 32 would be turned clockwise to engage the detent ball 105 in the recess 107 so that the lever arm would be retained in brake setting condition at the desired tension.

It will be apparent that many modifications and variations may be effected without departing from the scope of the novel concepts of the present invention.

I claim as my invention:

1. A brake lever construction comprising a first elongated member for mounting at the instrument panel of a vehicle, a second elongated member having a series of ratchet teeth therealong and generally axially aligned with said first elongated member, bracket means for mounting said first and second members for rotation on their longitudinal axes, coupling means connecting said first member to said second member for joint rotation, a brake lever arm pivotally mounted by said bracket means for applying the brakes of a vehicle by arcuate movement thereof relative to said first and second members, a sleeve member slidable along said second member and having pawl means cooperable with said ratchet teeth to hold said sleeve member in successive positions along said second member, and link means pivotally connected to said lever arm and to said sleeve member for moving said sleeve member along said second rod member as said brake lever arm is actuated to set the brakes, and said pawl means moving into locking engagement with successive teeth along said second member as the brakes are applied for holding said lever in successive attained positions through said link means.

2. A brake lever construction comprising a first elongated member for mounting at the instrument panel of a vehicle and having a handle at the rear end thereof for rotating said first member, a second elongated member having a series of ratchet teeth therealong and generally axially aligned with said first elongated member and forwardly thereof, bracket means for mounting said first and second members for rotation on their longitudinal axes, coupling means connecting said first member to said second member for joint rotation thereof upon turning of said handle, a brake lever arm pivotally mounted adjacent said second member for applying the brakes of the vehicle by arcuate movement relative to said second member, a sleeve member slidable along said second member and having pawl means cooperable with said ratchet teeth to hold said sleeve member in successive positions along said second member, and means engaging the lever arm at a region spaced from the second elongated member coupling said lever arm to said sleeve member for sliding said sleeve member along said second member as said brake lever arm is actuated to set the brakes, and said pawl means moving into locking engagement with successive teeth along said second member as the brakes are applied and holding said lever arm in successive attained positions, said ratchet teeth being releasable from said pawl means by manipulation of said handle to rotate said second member through said coupling means.

3. A brake lever construction comprising a first elongated member for mounting at the instrument panel of a vehicle and having a handle at the rear end thereof for rotating said first member, a second elongated member having a series of ratchet teeth therealong and generally axially aligned with said first elongated member and forwardly thereof, bracket means for mounting said first and second members for rotation on their longitudinal axes, coupling means connecting said first member to said second member for joint rotation thereof upon turning of said handle, a brake lever arm pivotally mounted adjacent said second member for applying the brakes of the vehicle by arcuate movement relative to said second member, a sleeve member slidable along said second member and having pawl means cooperable with said ratchet teeth to hold said sleeve member in successive positions along said second member, and means engaging the lever arm at a region spaced from the second elongated member coupling said lever arm to said sleeve member for sliding said sleeve member along said second member as said brake lever arm is actuated to set the brakes, and said pawl means moving into locking engagement with successive teeth along said second member as the brakes are applied and holding said lever arm in successive attained positions, said ratchet teeth being releasable from said pawl means by manipulation of said handle to rotate said second member through said coupling means, said coupling means between said first and second members comprising a socket in said second member receiving the forward end of said first member, and pin means retaining said first member in said socket and transmitting rotational movement of said first member for rotating said second member with said first member.

4. A brake lever construction comprising an elongated ratchet member for mounting at the instrument panel of a vehicle and having a series of ratchet teeth therealong, bracket means for mounting said ratchet member for rotation on its longitudinal axis, a brake lever arm pivotally mounted adjacent said ratchet member for applying the brakes of the vehicle by arcuate movement relative to said ratchet member, a sleeve member slidable along said ratchet member and having pawl means cooperable with said ratchet teeth to hold said sleeve member in successive positions along said ratchet member, and link means pivotally connected to said lever arm and to said sleeve member for moving said sleeve member along said ratchet member as said brake lever arm is actuated to set the brakes, and said pawl means moving into locking engagement with successive teeth along said ratchet member as the brakes are applied and holding said lever arm in successive attained position through said link means, said ratchet teeth being releasable from said pawl means by rotation of said ratchet member.

5. A brake lever construction comprising a ratchet member having a series of ratchet teeth therealong, bracket means for mounting said ratchet member for rotation on its longitudinal axis, a brake lever arm pivotally mounted by said bracket means for swinging movement adjacent said ratchet member in applying the brakes of the vehicle, a sleeve member slidable along said ratchet member and having pawl means cooperable with said ratchet teeth to hold said sleeve member in successive positions along said ratchet member, coupling means including linkage connecting said lever arm to said sleeve member for moving said sleeve along said ratchet member upon swinging movement of said lever arm in brake setting direction, said pawl means moving into locking engagement with successive teeth along said ratchet member as the brakes are applied and holding said lever arm in successive attained positions through said coupling means, said ratchet member being rotatable on its longitudinal axis to angularly move said ratchet teeth out of engagement with said pawl means in releasing said lever arm for return to initial brake release position, and detent means cooperating with said ratchet member to retain said ratchet member in a ratcheting angular orientation with the ratchet teeth engageable by said pawl means and in a non-ratcheting angular orientation with said ratchet teeth out of engageable relation to said pawl means.

6. A brake lever construction comprising a ratchet member having a series of ratchet teeth therealong, bracket means for mounting said ratchet member for rotation on its longitudinal axis, a brake lever arm pivotally mounted by said bracket means for swinging movement adjacent said ratchet member in applying the brakes of the vehicle, a sleeve member slidable along said ratchet member and having pawl means cooperable with said ratchet teeth to hold said sleeve member in successive positions along said ratchet member, coupling means engaging the lever arm at a region spaced from the ratchet member connecting said lever arm to said sleeve member for moving said sleeve member along said ratchet member upon swinging movement of said lever arm in brake setting direction, said pawl means moving into locking engagement with successive teeth along said ratchet member as the brakes are applied and holding said lever arm in successive attained positions through said coupling means, said ratchet member being rotatable on its longitudinal axis to angularly move said ratchet teeth out of engagement with said pawl means in releasing said lever arm for return to initial brake release position, and detent means cooperating with said ratchet member to retain said ratchet member in a ratcheting angular orientation with the ratchet teeth engageable by said pawl means and in a non-ratcheting angular orientation with said ratchet teeth out of engageable relation to said pawl means, said detent means comprising a housing sleeve encircling a portion of said ratchet member and engaged with said bracket means to prevent rotation thereof, said housing having a spring pressed detent ball therein acting against the periphery of said ratchet member, and said ratchet member having a pair of arcuately spaced recesses for receiving said ball, one of said recesses being longitudinally aligned with said detent ball when said ratchet teeth are in engageable relation with said pawl means, and the other of said recesses being aligned with said detent ball with said ratchet teeth out of engageable relation to said pawl means.

References Cited in the file of this patent

UNITED STATES PATENTS

| | | |
|---|---|---|
| 123,049 | Roper | Jan. 23, 1872 |
| 183,028 | Scott | Oct. 10, 1876 |
| 2,117,288 | Blucher | May 17, 1938 |
| 2,315,962 | Jandus | Apr. 6, 1943 |
| 2,531,130 | Jandus | Nov. 21, 1950 |